July 10, 1962  B. J. WOLLAR  3,043,157
MOTION CONVERTING MECHANISM PARTICULARLY USEFUL IN COUNTERS
Filed Nov. 16, 1959  3 Sheets-Sheet 1

INVENTOR.
BURNELL J. WOLLAR
BY
*Lyon & Lyon*
ATTORNEYS

July 10, 1962         B. J. WOLLAR         3,043,157
MOTION CONVERTING MECHANISM PARTICULARLY USEFUL IN COUNTERS
Filed Nov. 16, 1959                      3 Sheets-Sheet 2
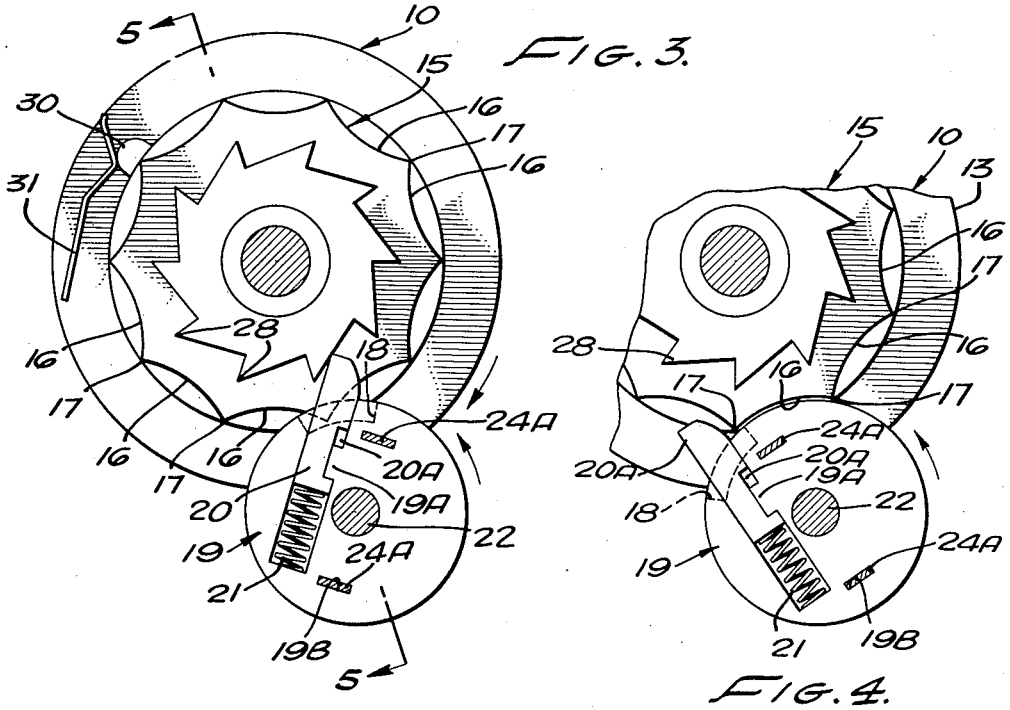
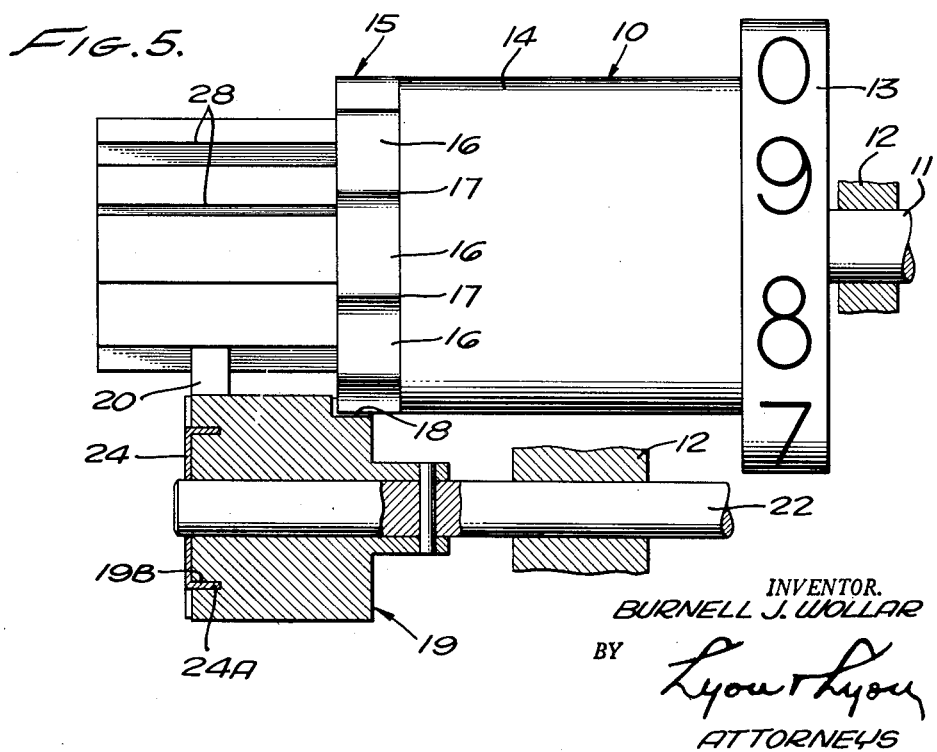
INVENTOR.
BURNELL J. WOLLAR
BY
Lyon & Lyon
ATTORNEYS July 10, 1962 B. J. WOLLAR 3,043,157
MOTION CONVERTING MECHANISM PARTICULARLY USEFUL IN COUNTERS
Filed Nov. 16, 1959 3 Sheets-Sheet 3
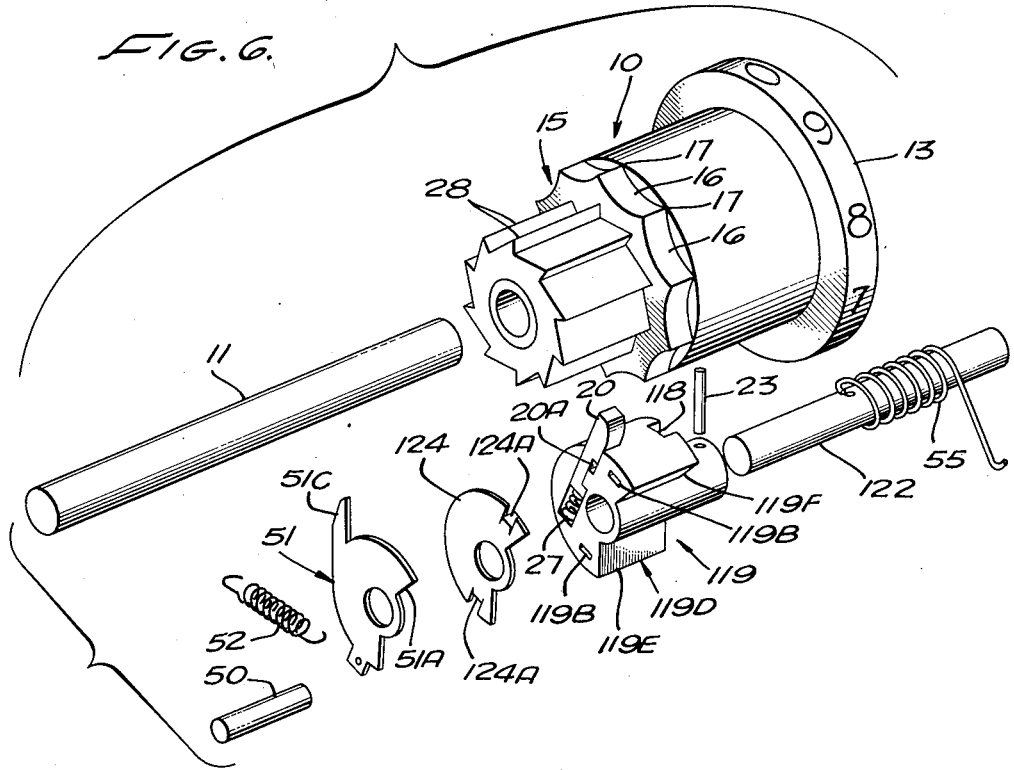
FIG. 6.
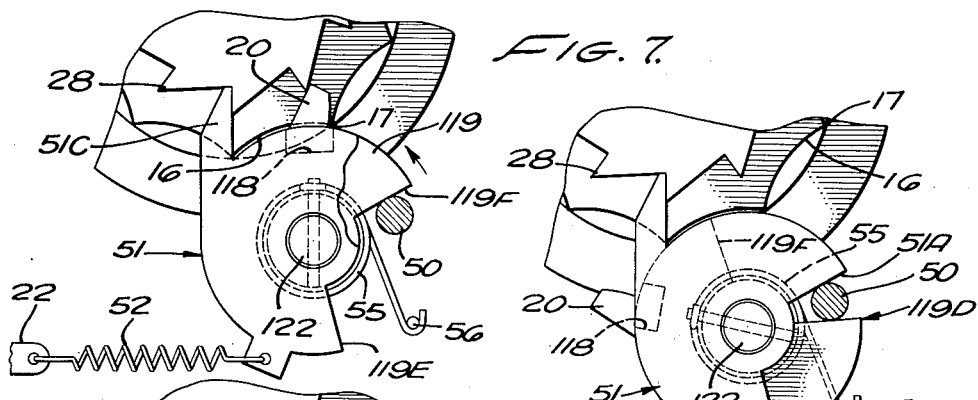
FIG. 7.
FIG. 8.
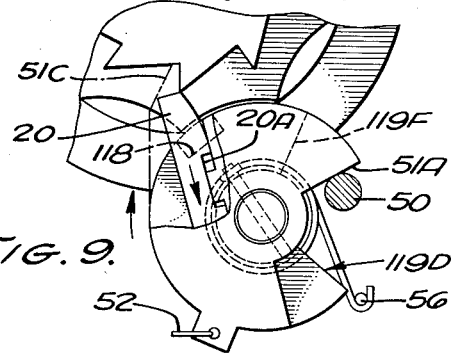
FIG. 9.
INVENTOR.
BURNELL J. WOLLAR
BY Lyon & Lyon
ATTORNEYS

United States Patent Office 3,043,157
Patented July 10, 1962

3,043,157
MOTION CONVERTING MECHANISM PARTICULARLY USEFUL IN COUNTERS
Burnell J. Wollar, Barrington, Ill., assignor to General Controls Co., Glendale, Calif., a corporation of California
Filed Nov. 16, 1959, Ser. No. 853,071
2 Claims. (Cl. 74—436)

The present invention relates generally to a motion transferring mechanism and more specifically to an improved counter in which movement of one part is effectively counted and indicated on a second part driven by the first part.

Briefly, the counter described herein may be operated on rotation of a driving shaft, by, for example, a driving motor, or the counter may be operated by imparting an oscillatory movement to a shaft as, for example, by a rotary-type solenoid. An important feature of the present invention involves a drive mechanism associated with a counter wheel such that the counter wheel can neither gain nor lose a count since it continuously is maintained in what may be termed a locked condition with respect to the driving mechanism. Another feature of the present arrangement is that it may be constructed to have almost unlimited pre-travel and over-travel in that the counter wheel may be operated at various time intervals after initiation of movement of the driving shaft, and further, overtravel of the driving shaft does not affect the desired result.

It is therefore an object of the present invention to provide generally an improved motion converting mechanism and especially one which is useful in counters.

Another object of the present invention is to provide an improved counter involving a novel driving mechanism adapted to be driven continuously as, for example, by a motor, or the driving mechanism may be oscillated as, for example, by a rotary solenoid, to effect a counting operation.

Another object of the present invention is to provide an improved counter in which the counter wheel remains in what may be termed a locked position with respect to the driving mechanism either while the counter wheel is in a stationary position or is being driven by the driving mechanism.

Another object of the present invention is to provide a counter of this character which has substantially unlimited pre-travel and over-travel.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURES 1–5 disclose one form of the present invention in which the drive mechanism for rotating the counter wheel may be rotated through 360 degrees.

FIGURES 6–9 disclose another form of the present invention in which the drive mechanism for rotating the counter wheel may be oscillated to produce rotation of the counter wheel.

FIGURES 3 and 4 are in general views like FIGURE 2 but with the parts in different operating position.

FIGURE 5 is a combination side elevational and sectional view, the section being taken substantially on the line 5—5 in FIGURE 3.

FIGURE 6 is a perspective view showing parts of the modified form of the present invention in disassembled form.

FIGURES 7, 8 and 9 show the parts of FIGURE 6 in assembled relation and in different operating positions.

Figures 1, 2:
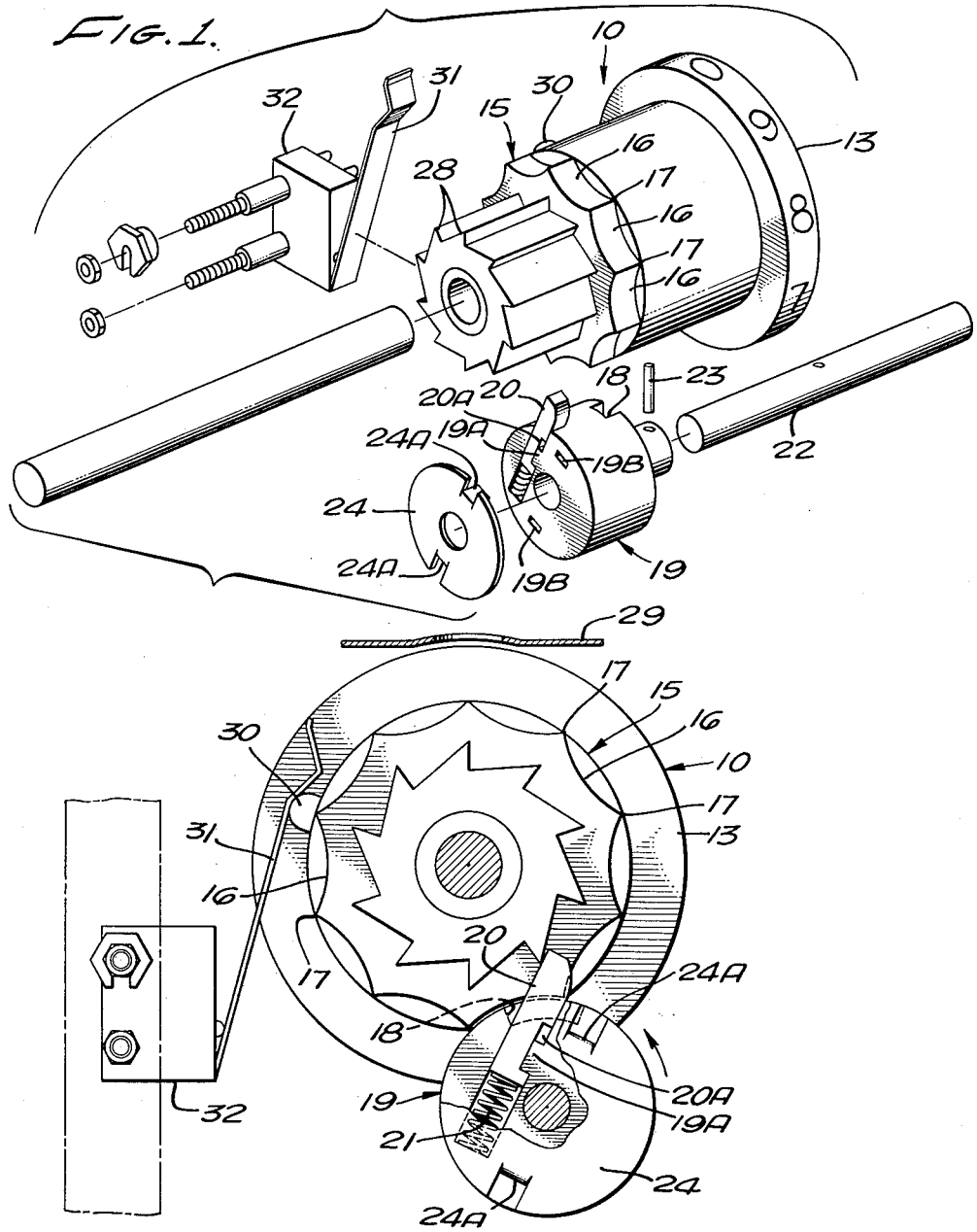
FIGURE 1 is a perspective view illustrating parts in disassembled form.
FIGURE 2 is an end view showing the elements of FIGURE 1 in assembled form with a portion of the cover for the driving member broken away.

Referring to FIGURES 1–5 and particularly FIGURE 5, the counter includes a counter wheel 10 having its shaft 11 suitably journalled for rotation in a stationary support, i.e. such as a frame or housing represented by hatched portion 12. This counter wheel 10 has a raised circular portion 13 on which is suitably inscribed ten equally spaced numerals, i.e. the numerals 0 to 9 both inclusive. The wheel 10 also has a cylindrical portion 14 having a so-called locking star 15 formed in its peripheral end portion. This locking star 15 comprises ten concave sections 16 of equal radius formed, for example, by a rotary cutter, there being one section 16 for each of the ten numerals. In accordance with an important feature of the present invention, adjacent concave sections 16 terminate along lines 17, each of which defines the extremity of a different pointed projection of the counter wheel, there being ten of such pointed projections arranged under proper conditions to enter a clearance slot 18 in the driving member 19 as shown in FIGURES 3 and 5.

The driving member 19 in FIGURES 1–5 is illustrated in the form of a cylindrical member formed to provide the previously mentioned clearance slot 18 in one end thereof and to provide a housing for a spring-biased pawl 20 in its other end. This driving member 19 has a shaft 22 centrally affixed thereto by pin 23 (FIGURE 1) and such shaft 22 is journalled for rotation in the casing or housing represented by the hatched portion 12 about an axis parallel to the rotational axis of the other shaft 11.

As perhaps best seen in FIGURE 4, the radius of each concave section 16 in the counter wheel 10 is slightly greater than the radius of the cylindrical driving member 19 so as to provide a slight clearance therebetween. This means that under the conditons shown in FIGURE 4, the counter wheel 10 is held against rotation by the peripheral surface of the driving member 19 yet the driving member 19 is free to rotate. The reason for this condition will be made clear by the following description.

As indicated previously, the driving member 19 houses a spring-biased pawl 20. This pawl 20 is normally pressed outwardly of the driving member 19 by the prestressed coil compression spring 21 positioned in a cavity in the member 19. Such outward movement of the pawl member 20 is limited by engagement of the stop 19A which is an integral part of the driving member 19 and which projects into an elongated slotted portion 20A in pawl 20. The pawl 20 thus has a limited amount of movement in the driving member 19 and may, together with its biasing spring 21, be retained by the cover plate 24 which is suitably fastened to the end wall of the driving member 19 by, for example, tongues 24A thereon engaging fastening openings 19B in such end wall.

This pawl 20 has its upper end engageable with the series of ten ratchet-like teeth 28 integrally formed with the counter wheel 10 as shown for accomplishing a result not generally accomplished by a conventional pawl and ratchet arrangement as described later.

Preferably a stationary window structure 29 (FIGURE 2) overlies the counter wheel to allow vision of only one of the numerals on the counter wheel.

Also, if desired, the counter wheel 10 may have a projection 30 thereon (FIGURE 2) for operating the actuating arm 31 of a conventional snap-action-type switch 32 once per revolution of the counter wheel 10.

The operation of the arrangement in FIGURES 1–5 is as follows. One revolution of the driving member 19 in the counterclockwise direction (FIGURES 1-4) results in one-tenth of one revolution of the counter wheel 10. When the driving shaft 22 is stationary, i.e. at the beginning of an operating cycle, the parts are as shown in FIGURE 2 with the clearance slot 18 at least partially "covered" by the concave star wheel surface 16. Under this condition the counter wheel 10 is prevented from moving as long as the driving member 19 remains stationary, this being so because such curved concave surface 16 practically abuts and conforms generally with the curved peripheral surface of the driving member 19. However, the member 19 is free to rotate and when it is rotated in the counterclockwise direction, the conditions illustrated progressively in FIGURES 3 and 4 result.

Thus, on initial rotation of member 19, the spring-biased pawl 20 comes into engagement with one of the ratchet-like teeth 28 and exerts a force thereon tending to rotate the counter wheel 10 in the clockwise direction. When driving member 19 is moving in a counterclockwise direction, one of the ratchet-like teeth 28 will bear pressure against the pawl 20 in a tangential direction opposite to the direction the driving member 19 is moving. This locks the pawl 20 in place causing the driven member 10 to rotate in a clockwise direction, however, only if the clearance slot 18 is positioned properly, allowing the projection 17 clearance to pass at the proper instant (see FIGURE 3).

After the pawl 20 has driven the driven member 10 through 36°, the pawl 20 clears away from the ratchet-like teeth 28 as does the clearance slot 18 from the projection 17. Continued rotation of member 19 results in the condition shown in FIGURE 4 wherein a pointed projection 17 is no longer in the clearance slot 18 and adjacent curved surface 16 of the counter wheel 10 and curved surface of the member 19 prevents further rotation of the counter wheel 10.

The arrangement shown in FIGURES 6-9 accomplishes generally the same result but in accordance with an oscillatory movement of the driving shaft 122 as distinct from a rotary movement of the corresponding shaft 22 as in FIGURES 1-5.

For purposes of comparison and simplification of this description, corresponding parts in the two arrangements herein have either the same reference numeral or in FIGURES 6-9 the reference numeral in some cases is raised by 100.

The construction and mounting of the counter wheel in FIGURES 6-9 is as described in FIGURES 1-5 and there is a like cooperation between the projections 17 thereon with the clearance slot 118 (18 in FIGURES 1-5) in the driving member 119 which is now modified to include an open segmental portion 119D defined by circumferentially spaced walls 119E, 119F.

These spaced walls 119E, 119F are in turn engageable with a stationary stop pin 50 (newly added) which serves to allow only an oscillatory movement of the driving member 119. This stop pin 50 also serves to limit movement of pivoted spring-biased pawl lever 51 (newly added) which is otherwise free to pivot on the protruding end of shaft 122.

This lever 51 is normally biased in a clockwise diretoin by a tension spring 52 having one of its ends fastened to the supporting stationary frame 22 and the other one of its ends attached to ratchet lever 51 to produce engagement of the cam lever surface 51A with the stop pin 50.

The shaft 122, which is attached centrally to the driving member 119 by pin 23 and which is oscillatable about an axis extending parallel to the rotatoinal axis of shaft 11, in this case has a prestressed torsion spring 55 wound around it with one end of such spring 55 attached to it and the other end of the spring 55 is stationarily anchored to the frame member 56 to bias the driving member 119 in the clockwise direction in FIGURES 6-9 with the surface 119F engaged by the stop pin 50 as shown in FIGURE 7.

The operation of the arrangement in FIGURES 6-9 is essentially as described above in connection with FIGURES 1-5 but in this case the shaft 122 is oscillated instead of rotated.

Energy for effecting counterclockwise rotation of shaft 122 through a limited angular distance corresponding generally to the angular distance between faces 119E and 119F may be accomplished by any well known means (not shown), for example, a rotary solenoid having a partially rotatable shaft coupled to shaft 122 for producing counterclockwise movement of shaft 122 when the solenoid is energized.

Thus, initially the parts are assumed to be in the position illustrated in FIGURE 7 wherein the torsion spring 55 presses the face 119F into engagement with the stop pin 50 and the tension spring 52 presses the pawl end 51C into engagement with one of the ratchet teeth 28 to further assure non-rotation of the counter wheel 10 in the clockwise direction, such counter wheel 10 being also locked as before due to the interaction between the peripheral surface of the driving member 119 and adjacent concave surface 16 of the star wheel portion 15.

Upon initial rotation of the shaft 122 in the counterclockwise direction, the spring-biased pawl 20 is again effective to cause the pointed end 17 between adjacent concave surfaces 16 to enter the clearance slot 118 to effect a positive driving connection between the members 119 and 10; and in the meantime, the spring-biased pawl 51 is pivoted independently about the extension of shaft 122. This movement continues until the clearance slot 118 is no longer in registry with a pointed end 17 and the ratchet tooth 28 moves over and past the spring-biased pawl 51. The spring 52 returns the pawl end 51C into engagement with the next adjacent pawl tooth 28 and the torsion spring 55 returns the pawl 20 to its initial position shown in FIGURE 7 after the driving force initially applied to shaft 122 is removed. It is noted in this operation that the force exerted by spring 21 is strong enough to cause initial movement of the counter wheel 10 by the pawl 20 notwithstanding the biasing force exerted by spring 52. Also, the upper end of pawl 20 is so shaped and is sufficiently retracted to allow the pawl 20 to move past ratchet tooth 28 in the return movement of the driving member 119 by torsion spring 55. This return is accomplished as follows. During the return stroke the pawl 20 comes into contact with the ratchet tooth 28, the pressure now, however, is in an axial direction to the pawl 20, and allows the pawl 20 to be depressed against the compression spring 21 allowing the driving member 119 to return to its normal operating position against stop 50. During this return stroke, however, there is a possibility that the number wheel 10 would also want to return in a counterclockwise direction. Ratchet lever 51 is provided that locks against ratchet tooth 28 allowing movement in only the clockwise direction of number wheel 10. The ratchet lever 51 pivots on shaft 122 and is under tension by spring 52 such that in the normal counting stroke it pivots aside every time a tooth of ratchet 28 is driven 36° and then is snapped back into a locking position on the next tooth.

It will also be observed that the counter wheel 10 is at all times in what may be termed a "locked" condition with respect to the driving member 19 (FIGURE 1) or 119 (FIGURE 6) in that there is always a positive cooperation between the wheel 10 and driving member, i.e. either when a pointed end 17 is in engagement with the walls of the clearance slot 18 or 118 or when the pointed end is out of such engagement, in which latter case the adjacent curved surface of driving member 19 or 119 prevents independent rotation of the counter wheel 10.

Further, it is noted that the faces 119E and 119F may be so located that there may be different degrees of pretravel of the driving member 19 or 119 before a pointed end 17 is engaged to produce rotation of the counter wheel. Also, it is noted that the present arrangement is not dependent on the degree of over-travel of the driving member 19 or 119 but, indeed, such over-travel may constitute a relatively larger angular distance as exemplified particularly so with respect to the arrangement shown in FIGURES 1-5.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A motion converting mechanism comprising a driving member and a driven member, said driven member having a plurality of concave surfaces along its periphery with adjacent surfaces terminating in a pointed end, said driving member having a peripheral surface complementary with each of said concave surfaces and having a clearance slot for said pointed end, a wall of said clearance slot cooperating with said pointed end to establish a driving connection between said driving and driven members, said driven member having ratchet-like elements spaced along a peripheral portion of the same, a spring-biased pawl mounted on said driving member and engageable and ridable over said ratchet-like elements upon rotation of said driving member, said clearance slot being in registry with said pointed end when said pawl is in engagement with one of said ratchet-like elements whereby rotation of said driving member causes the pawl to engage one of said ratchet-like elements and move said pointed end into engagement with the wall of said clearance slot.

2. A mechanism as set forth in claim 1 in which said driving member comprises generally a cylindrical member having a peripheral portion thereof defining said peripheral surface, said cylindrical member having an elongated slotted portion defining generally a pair of radially extending walls thereof, and stop means engageable with said walls.

References Cited in the file of this patent

UNITED STATES PATENTS

| | | |
|---|---|---|
| 469,003 | Weiss | Feb. 16, 1892 |
| 591,762 | Hart | Oct. 12, 1897 |
| 738,962 | Wall | Sept. 15, 1903 |
| 1,529,591 | Huber | Mar. 10, 1925 |
| 2,169,567 | May | Aug. 15, 1939 |
| 2,447,839 | Bingley | Aug. 24, 1948 |
| 2,483,359 | Bliss | Sept. 27, 1949 |
| 2,704,395 | Heidegger | Mar. 22, 1955 |
| 2,795,150 | Seidler | June 11, 1957 |
| 2,934,970 | Parstorfer | May 3, 1960 |